US010176655B2

(12) United States Patent
Gullicksen

(10) Patent No.: US 10,176,655 B2
(45) Date of Patent: Jan. 8, 2019

(54) CONTROLLING LOCKABLE DEVICES USING ELECTRONIC KEY

(71) Applicant: Gullicksen Brothers, LLC, Campbell, CA (US)

(72) Inventor: Jeff Gullicksen, Mountain View, CA (US)

(73) Assignee: Reavire, Inc., Campbell, CA (US)

( * ) Notice: Subject to any disclaimer, the term of this patent is extended or adjusted under 35 U.S.C. 154(b) by 0 days.

(21) Appl. No.: 15/790,440

(22) Filed: Oct. 23, 2017

(65) Prior Publication Data
US 2018/0114385 A1  Apr. 26, 2018

Related U.S. Application Data

(60) Provisional application No. 62/413,340, filed on Oct. 26, 2016.

(51) Int. Cl.
G07C 9/00 (2006.01)
H04W 12/06 (2009.01)

(52) U.S. Cl.
CPC ........ G07C 9/00182 (2013.01); H04W 12/06 (2013.01); G07C 2009/0019 (2013.01); G07C 2009/00277 (2013.01); G07C 2009/00769 (2013.01)

(58) Field of Classification Search
CPC ........ G07C 9/00182; G07C 2009/0019; G07C 2009/00769; G07C 2009/00277; H04W 12/06; H04W 4/21; H04W 4/50
USPC .......................................................... 340/5.7
See application file for complete search history.

(56) References Cited

U.S. PATENT DOCUMENTS

| 5,917,449 | A | 6/1999 | Sanderford et al. |
| 6,249,680 | B1 | 6/2001 | Wax et al. |
| 7,692,532 | B2 | 4/2010 | Fischer et al. |
| 8,150,384 | B2 | 4/2012 | Abifaker et al. |
| 8,656,473 | B2 | 2/2014 | Hall et al. |

(Continued)

FOREIGN PATENT DOCUMENTS

| CN | 104902564 | 9/2015 |
| KR | 1020160000873 | 1/2016 |

(Continued)

OTHER PUBLICATIONS

Li Bing et al: CSI-Based WiFi-Inertial State Estimation; 2016 IEEE International Conference on Multisensor Fusion and Integration for Intelligent Systems (MFI), IEEE, Sep. 19, 2016, pp. 245-250.

(Continued)

Primary Examiner — Ali Neyzari
(74) Attorney, Agent, or Firm — BainwoodHuang

(57) ABSTRACT

A technique for controlling lockable devices includes a key device wirelessly transmitting a first request to a server apparatus. The server apparatus receives the first request and proceeds to identify a controllable lock whose location the server apparatus has measured to be within a physical space mapped by the server apparatus, causing the identified controllable lock to emit a human-detectable indication. In response to an action by a user, the key device wirelessly transmits a second request that directs the server apparatus to toggle a lock state of the identified controllable lock, such as to lock the controllable lock or to unlock it.

22 Claims, 6 Drawing Sheets

(56) References Cited

U.S. PATENT DOCUMENTS

| | | |
|---|---|---|
| 9,001,129 B2 | 4/2015 | Rhee et al. |
| 9,041,622 B2 | 5/2015 | McCulloch et al. |
| 9,084,217 B2 | 7/2015 | Wax et al. |
| 9,288,632 B2 | 3/2016 | Yang et al. |
| 9,516,503 B2 | 12/2016 | Berns et al. |
| 9,843,772 B2 | 12/2017 | Lee et al. |
| 2004/0080412 A1 | 4/2004 | Smith et al. |
| 2006/0143292 A1 | 6/2006 | Taubenheim et al. |
| 2011/0312311 A1* | 12/2011 | Abifaker ............ H04W 4/21 455/418 |
| 2013/0244684 A1 | 9/2013 | Kadous et al. |
| 2016/0026253 A1 | 1/2016 | Bradski et al. |
| 2016/0127372 A1 | 5/2016 | Unterschuetz |

FOREIGN PATENT DOCUMENTS

| | | |
|---|---|---|
| WO | 2003075125 | 9/2003 |
| WO | 2013028908 | 2/2013 |

OTHER PUBLICATIONS

Logitech Spotlight Wireless Presentation Remote web pages downloaded from https://www.logitech.com/en-us/product/spotlight-presentation-remote.

Shop Nintendo, Nintendo Online Store web pages downloaded from https://store.nintendo.com/ng3/browse/productDetailColorSizePicker.jsp?productId=prod300018.

Mira Prism Augmented Reality Headset web pages downloaded from https://www.mirareality.com/.

Domotics: "La HC2 de Fibaro gere aussi les cameras IP"; Dec. 19, 2013; pp. 1-12.

"Fibaro UK Permissions & Access control"; Feb. 2, 2016; 4 pages.

International Application No. PCT/US2017/047154 International Search Report and Written Opinion including PCT/ISA/220, PCT/ISA/210, and PCT/ISA/237 to Gullicksen Brothers, LLC, dated Nov. 6, 2017, 15 pages.

\* cited by examiner

CONTROLLING LOCKABLE DEVICES USING ELECTRONIC KEY

CROSS-REFERENCES TO RELATED APPLICATIONS

This application claims the benefit of U.S. Provisional Application No. 62/413,340, filed Oct. 26, 2016, the contents and teachings of which are incorporated herein by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

BACKGROUND

1. Field of the Invention

This invention relates generally to electronic keys, and more particularly to electronic keys that employ wireless communication and location information for controlling lockable devices.

2. Description of Related Art

People have been using keys and locks to protect valuables for hundreds if not thousands of years. Flat metal keys date back to the $19^{th}$ century. Electronic approaches have enhanced the convenience of lock-and-key mechanisms. For example, programmable keypads find applications for controlling access to homes, offices, rooms, and safes. Electronic car keys remotely set car door locks, activate alarm systems, and grant trunk access.

In recent years, consumers have adopted key card systems for controlling access to hotel room doors, security gates, and office spaces. A typical key card system for a business includes a central management server and multiple point-of-entry card scanners mounted adjacent to entry doors. During usage, a person presents a key card to a card scanner at a point of entry. The card scanner scans the card and contacts the central management server to process an unlock request for the point of entry, allowing the person to enter.

SUMMARY

Unfortunately, conventional electronic keys fail to take full advantage of the range of enhancements made possible by modern wireless technology. In contrast with conventional electronic key systems, an improved technique for controlling lockable devices involves a key device and a server apparatus. The key device wirelessly transmits a first request to the server apparatus. The server apparatus receives the first request and proceeds to identify a controllable lock whose location the server apparatus has measured to be within a physical space mapped by the server apparatus. The server apparatus directs the identified controllable lock to issue a human-detectable indication, such as a light or sound. A user of the key device, who may observe the human-detectable indication, then provides user input to the key device, which causes the key device to wirelessly transmit a second request to the server apparatus. The second request directs the server apparatus to toggle a lock state of the identified controllable lock, such as to lock the controllable lock or to unlock it.

Advantageously, the improved technique enables the same key device to be used with any number of lockable devices, which may be controlled by any number of key devices. Instead of having to carry a ring of metal keys, electronic keys, or key cards, a person may carry only a single key device that does the work of all of them. In addition, rights to access electronic locks can readily be established, withdrawn, and shared. Embodiments of the improved technique also benefit from location services, which may assist in identifying locks to be controlled based on location of the key device and/or locations of the locks.

In some examples, the key device may be realized as a small, handheld device that fits in a user's pocket or purse, and which has a simple user interface that enables user control over a wide range of lockable devices. In other examples, the key device may be realized, at least in some respects, by a smart phone, tablet computer, or other computing device, which is programmed with software for realizing key-device operations.

In some examples, the server apparatus measures a physical location of the key device relative to the physical space and selects the identified controllable lock from among multiple candidates in the physical space based at least in part on proximity to the key device relative to the candidates.

In some examples, the server apparatus cycles through at least one candidate lock before arriving at the identified controllable lock, and advances to a next candidate lock in response to the a user action, such as the user operating a control on the key device.

In some examples, the key device includes an orientation sensor and the first request includes an orientation measurement made by the orientation sensor. The orientation measurement indicates a direction in which the key device is pointing. In such cases, selecting the controllable lock by the server apparatus may further be based on the orientation measurement.

In some examples, identifying the physical location of the key device is performed by sensing a wireless packet emitted by the key device using a location positioning service that includes multiple antenna units. According to some variants, the wireless packet emitted by the key device includes the orientation measurement.

In some examples, the server apparatus stores a map of the physical space. In such cases, selecting the controllable lock by the server apparatus may further be based on the map indicating that the key device has an unobstructed view of the controllable lock.

According to some examples, prior to transmitting the first request, the key device performs a biometric test of the user of the key device to confirm an identity of the user. In such cases, the key device is configured to transmit the first request in response to the biometric test succeeding and to prevent transmission of the first request in response to the biometric test not succeeding. Thus, for example, transmission of the first request depends upon the biometric test succeeding.

In some examples, performing the biometric test includes operating a thumbprint sensor in the key device. According to some variants, the thumbprint sensor is incorporated in a button of the key device, and transmitting the first request is performed in response to (i) the user pushing the button and (ii) the key device successfully authenticating the user using the thumbprint sensor.

According to some examples, the key device may be operated in a second physical space mapped by a second server apparatus. In response to the user operating a control on the key device when the key device is disposed in the second physical space, the key device begins a process that sends identifying information about the user to an element in the second physical location. For example, (i) the key device wirelessly sends a user identifier of the user to the second server apparatus, (ii) the second server apparatus contacts the server apparatus to request the identifying information about the user, (iii) the server apparatus provides the identifying information about the user to the second server apparatus, and (iv) the second server apparatus provides the identifying information about the user to the element in the second physical space.

In some examples, the key device is used to unlock a software entity, such as a login function on a computer or computer-accessible resource. For example, in response to a request to access the login function, the server apparatus sends a message to the key device, and the user is required to perform an action on the key device, such as to push a button, to allow the login function to be accessed.

According to some examples, the key device unlocks a controllable lock by establishing a first point-to-point session between the key device and the controllable lock and by establishing a second point-to-point session between the controllable lock and the server apparatus. The server apparatus may then direct the controllable lock to unlock in response to exchanging authentication content over the first point-to-point session and the second point-to-point session.

According to some variants, when operating the key device to unlock the controllable lock, the key device is disposed outside the mapped physical space.

According to some variants, the server apparatus is a mobile server apparatus disposed within an automobile.

In some examples, the key device is a portable device having a portable power source. The key device may assume an inactive state and transition to an active state in response to the key device receiving wireless energy emitted by a controllable lock. According to some variants, the server apparatus may direct the controllable lock to unlock automatically in response to the key device transitioning from the inactive state to the active state. According to some variants, transmitting the first request is performed automatically by the key device upon transitioning from the inactive state to the active state.

According to some examples, the key device unlocks a controllable lock by (i) making physical contact with the third controllable lock and (ii) while making physical contact, sending a shared secret to the third controllable lock over an optical connection.

According to some variants, sending the shared secret over the optical connection is carried out in response to a user operation on the key device performed while the key device and the controllable lock are making physical contact.

According to some variants, the key device includes a contact interface having an infrared transceiver. With the contact interface of the key device placed against a contact interface of a second key device, identifying information is exchanged over the optical connection about the user of the key device and a second user of the second key device to enable subsequent communication between the user and the second user.

Certain embodiments are directed to a method of electronically controlling lockable devices. The method includes wirelessly transmitting a first request from a key device to a server apparatus and identifying, by the server apparatus in response to receiving the first request, a controllable lock whose location the server apparatus has measured to be within a physical space mapped by the server apparatus. The method further includes directing, by the server apparatus, the controllable lock to issue a human-detectable indication that the controllable lock has been selected for operation. In response to the key device receiving user input from a human user after the controllable lock has issued the human-detectable indication, the method still further includes wirelessly transmitting a second request from the key device to the server apparatus, the second request directing the server apparatus to toggle a lock state of the controllable lock.

Other embodiments are directed to a computer program product including a set of non-transitory, computer-readable media having instructions which, when executed by control circuitry, cause the control circuitry to perform a method of controlling lockable devices, such as the method described above. Further embodiments are directed to an electronic key device that includes a body, a user control in the body, and control circuitry including a set of processors and memory. The control circuitry is constructed and arranged to wirelessly transmit, in response to a first operation of the user control, a first request to a server apparatus. The first request directs the server apparatus to identify a controllable lock whose location the server apparatus has measured to be within a physical space mapped by the server apparatus. In response to a second operation of the user control, the control circuitry is further constructed and arranged to wirelessly transmit a second request from the key device to the server apparatus. The second request directs the server apparatus to toggle a lock state of the controllable lock identified in response to the first operation of the user control.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Figure 1:
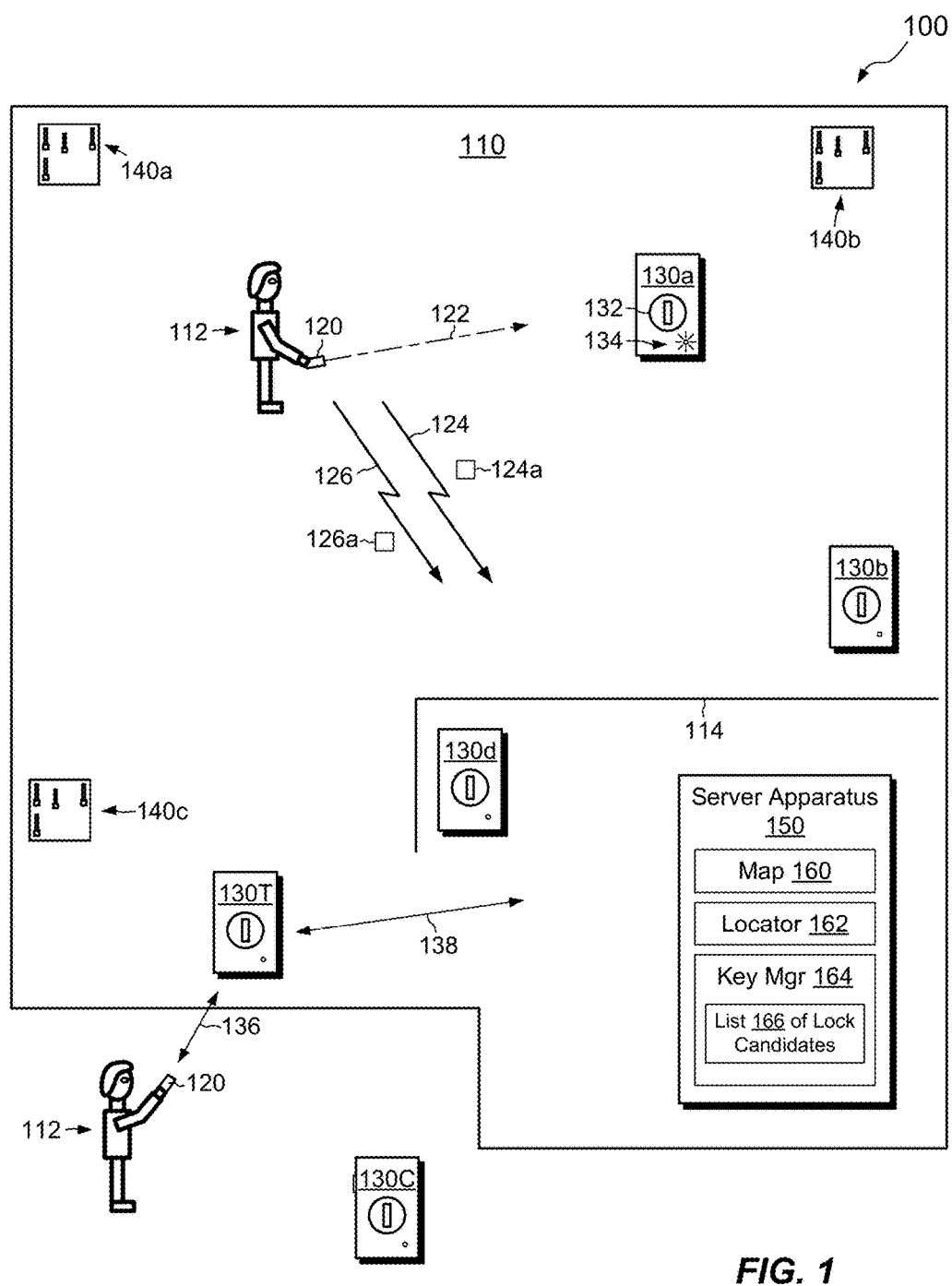
FIG. 1 is a block diagram of an example vault appliance and local environment in which embodiments of the techniques hereof can be practiced.

Embodiments of the invention will now be described. Once should appreciate that such embodiments are provided by way of example to illustrate certain features and principles of the invention but that the invention hereof is not limited to the particular embodiments described.

An improved technique for controlling lockable devices includes a key device wirelessly transmitting a first request to a server apparatus. The server apparatus receives the first request and proceeds to identify a controllable lock whose location the server apparatus has measured to be within a physical space mapped by the server apparatus, causing the identified controllable lock to emit a human-detectable indication. In response to an action by a user, the key device wirelessly transmits a second request that directs the server apparatus to toggle a lock state of the identified controllable lock, such as to lock the controllable lock or to unlock it.

Protocols for operating locks as described herein may employ location services, with control over the state of a lock based at least in part on the location of the lock relative to a mapped physical space. In some cases, control over a lock is further based on the location of the key device relative to the mapped physical space. Mapping of a physical space may be performed in any suitable way, such as those described in copending U.S. application Ser. No. 15/452,451, filed Mar. 7, 2017 and entitled "CONTROLLING ACCESS TO A COMPUTER NETWORK USING MEASURED DEVICE LOCATION," and in copending U.S. application Ser. No. 15/727,103, filed Oct. 6, 2017 and entitled "LOCATING DEVICES BASED ON ANTENNA COORDINATES." The contents and teachings of both prior applications are incorporated herein by reference. These applications describe techniques for locating devices in physical spaces based on wireless signals emitted by the devices and for defining a mapped physical space in which devices may be required to be present in order for the devices to exercise rights. As these applications describe, a vault appliance may be employed for securely dispatching rights. Additional information about an example vault appliance may be found in copending U.S. application Ser. No. 15/347,551, filed Nov. 9, 2016 and entitled "VAULT APPLIANCE FOR IDENTITY VERIFICATION AND SECURE DISPATCH OF RIGHTS," the contents and teachings of which are incorporated herein by reference. Although embodiments as described herein may benefit from the particular teachings of the incorporated applications, the invention herein is not limited to such teachings, which are intended merely to be illustrative.

As used herein, the terms "lock," "controllable lock," and "lockable device" interchangeably refer to electronically controllable devices that can be toggled between a locked state, in which access to protected contents or actions is blocked, and an unlocked state, in which access to protected contents or actions is allowed. These terms describe not only physical locks, such as door locks, safe locks, car locks, and the like, but also locks applied to data and/or to computerized activities.

FIG. 1 shows an example environment in which embodiments of the improved technique can be practiced. Here, a physical space 110 is provided in which a user 112 operates an electronic key device 120. In a particular example, the key device 120 is a small, special-purpose device that fits in a pocket or purse. However, the key device 120 may be any smart device capable of wireless communication, such as a smart phone, tablet, PDA (personal data assistant), laptop, or the like. Multiple antenna units 140 (140a, 140b, and 140c) are placed around the physical space 110 in stable locations. In some examples, the antenna units 140 are configured as WAPs (wireless access points), where each WAP includes multiple antennas. Additional antenna units 140 may be provided. The physical space 110 may be wholly indoors, wholly outdoors, or may include both indoor and outdoor regions.

A server apparatus 150 is operatively connected to the antenna units 140, e.g., using wires or wirelessly. In an example, the server apparatus 150a and the antenna units are parts of a wireless network that operates in the physical space 110. The server apparatus 150 includes a map 160 of the physical space 110, a locator 162, and a key manager 164. In an example, the map 160 stores locations of walls, floors, ceilings, furniture, and other features of the physical space 110 and defines a secure zone of operation. The locator 162 is configured to measure locations of wireless devices based on input from the antenna units 140, e.g., in response to wireless signals emitted by the devices. The key manager 164 includes instructions and data for managing communications with key devices, such as key device 120.

Various locks 130 may be located both inside and outside the physical space 110. Each lock 130 may include a lockable element 132 and an indicator 134. In an example, the lockable element 132 is an electronically actuated locking mechanism, such as a latch or bolt. The indicator 134 may be a light, speaker, or other component capable of producing a human-detectable indication. Locks 130 are themselves wireless devices and may be members of the same wireless network to which the antenna units 140 and server apparatus 150 are connected. The network may employ Wi-Fi (IEEE 802.11) and/or other wireless communication standards. Also, in an example, locks 130 are registered with the server apparatus 150. For example, the server apparatus 150 may store profile information about locks 130, which may include identifying information, rights of users to control the locks, and codes for operating the locks.

Locks 130 may be classified broadly in three groups, based on the protocols used to access the locks:

Zone locks. Locks located within a mapped physical space (e.g., physical space 110) that are controlled by a key device 120, which is also located within the physical space. Control is based on (i) communication between the key device 120 and the server apparatus 150 and (ii) communication between the server apparatus 150 and the locks. In an example, zone locks are controlled by action rights, as described in the above-incorporated U.S. patent application Ser. No. 15/347,551.

Tunnel locks. Locks located within a physical space that are controlled by a key device 120. Control is based on (i) point-to-point communication between the key device 120 and the locks and (ii) point-to-point communication between the locks and a server apparatus 150. The key device 120 need not itself be located in any mapped physical space in order to control a tunnel lock, provided that the key device 120 is within wireless range of the tunnel lock to be controlled.

Contact locks. Locks that are controlled based on physical contact between the key device 120 and the locks 130. Neither the key device 120 nor the contact locks are required to be located in any mapped physical space 110.

Certain locks 130 may be designated exclusively as zone locks, tunnel locks, or contact locks; however, this is not required. For example, some locks 130 support multiple protocols. Thus, the same lock that is accessible as a zone lock may also be accessible as a tunnel lock and/or as a contact lock.

In example operation, the user 112 desires to open a lock 130a, which is configured as a zone lock, and operates a control on the key device 120, such as a "Select" button. Upon operation of the control, the key device 120 wirelessly sends a first request 124 to the server apparatus 150, e.g., in a Wi-Fi packet 124a over the above-mentioned wireless network. Upon receipt of the first request 124, the server apparatus 150 identifies a particular lock 130, based on a set of criteria, and directs the identified lock, in this case lock 130a, to issue a human-detectable indication, e.g., by activating the indicator 134. The user 112 observes the indication, e.g., by seeing a blinking light or hearing a sound emitted by the lock 130a, and confirms the identification of the lock 130a via user input to the key device 120. For example, the user 112 operates the same user control (the Select button) a second time. In response to the user input, the key device 120 wirelessly sends a second request 126 (e.g., via Wi-Fi packet 126a) to the server apparatus 150. The server apparatus 150 receives the second request 126 as confirmation and proceeds to direct the lock 130a to unlock. For example, the server apparatus 150 sends a predetermined code to the lock 130a. The lock 130a receives the code and applies the code to open the lock 130a. A similar sequence can be used to lock the lock 130a and/or to toggle the lock 130a back and forth between locked and unlocked states.

The server apparatus 150 may apply various criteria in identifying the lock to be controlled. For example, the key manager 164 generates a list 166 of lock candidates, e.g., by performing a discovery operation to identify all registered locks that respond to a wireless query. In some examples, the key manager 164 associates each discovered lock with a respective location of that lock in the physical space 110. For example, the locator 162 may measure the location of each of the discovered locks based on wireless signals emitted by the respective locks. The locator 162 may also measure the location of the key device 120, e.g., based on wireless signals emitted by the key device 120, such as the Wi-Fi packet 124a. The key manager 164 may then rank locks on the list 166 based on their proximity to the key device 120, with closer locks appearing higher on the list than locks that are farther away.

In some examples, the key device 120 includes an orientation sensor, such as an IMU (inertial measurement unit), which provides an orientation measurement that identifies a direction in which the key device 120 is pointing. The key device 120 may transmit the orientation measurement to the server apparatus 150, e.g., in the packet 124a. The key manager 164 then combines the orientation measurement with the measured location of the key device 120 to construct a virtual ray 122, whose origin is the key device 120 and whose direction is based on the orientation measurement. For example, the user 112 may point the key device 120 at the lock 130a, and the key manager 164 may detect this fact by determining that the virtual ray 122 intersects the location of the lock 130a. The key manager 164 may search the map 160 to identify any discovered locks within a predetermined distance of the virtual ray 122, arranging the list 166 accordingly, e.g., by ranking discovered locks whose locations are closer to the virtual ray 122 higher than it ranks those whose locations are farther away. Additional information about identifying objects using virtual rays may be found in copending U.S. application Ser. No. 15/655,489, filed Jul. 20, 2017 and entitled "CONTROLLING OBJECTS USING VIRTUAL RAYS," the contents and teachings of which are incorporated herein by reference.

In further examples, the key manager 164 applies information from the map 160 about the physical locations of walls, ceilings, floors, furniture, and other barriers when arranging the list 166 of lock candidates. The key manager 164 may then provide higher rankings to locks that are in direct view of the key device 120, i.e., to locks 130 for which the key device 120 has an unobstructed view. In some examples, obstructed locks may be omitted from the list 166 altogether. For example, in the arrangement of FIG. 1, lock 130d may be omitted from the list 166 or may receive a low rank on account of a wall 114 blocking it from view of the key device 120.

One should appreciate that the key manager 164 may employ any number of criteria in ranking the list 166 of lock candidates and may use any suitable method for combining criteria. Methods of combining criteria may include rule-based approaches, neural nets, fuzzy logic, reinforcement learning, and the like, for example.

When identifying a lock 130 in response to the first request 124, the key manager 124 selects the highest ranking lock from the list 166 and direct that lock to issue the human-detectable indication. The user 112 may accept or reject the selection. Acceptance of the selection is described above; for example, the user 112 operates the same control (e.g., the Select button) a second time. The user 112 may reject the selection by operating a second control on the key device 120, such as a "Next" button. In response to the user 112 operating the second control, the key device 120 conveys the action to the server apparatus 150, which selects the next lock from the list 166 and directs that lock to issue a human-detectable indication, which the user 112 may accept or reject. Operation may repeat in this fashion until the desired lock identifies itself, at which point the user 112 may select the desired lock, e.g., by operating the Select button.

In this manner, the user 112 can easily select a desired lock for operation. For example, one push of the Select button starts the process and another push of the Select button selects the desired lock. If an unintended lock identifies itself after initially pushing the Select button, the user 112 may keep pushing the Next button until the desired lock identifies itself.

In some examples, the key manager 164 maintains a record of user actions and adapts the order of candidates on the list 166 to accommodate the user's behavior. For example, the key manager 164 may detect that the user's selection of a particular lock is usually the second candidate presented, with the first candidate seldom being selected. In such cases the key manager 164 may promote the second key on the list 166 to be first.

In some examples, the key device 120 itself requires user authentication before permitting operation of any locks 130. For instance, the key device 120 may include a biometric sensor, such as a thumbprint sensor, voice detector, camera, or other sensor. In a particular example, a thumbprint sensor is integrated into the Select button, such that the user 112 merely needs to press the Select button with a trained thumb or finger to unlock the key device 120. With this arrangement, the same user action that unlocks the key device 120 may also serve as a user command to the key device 120 to send the first request 124.

FIG. 1 further shows an example of a tunnel lock 130T. For this example, the user 112 is located outside the physical space 110 but wishes to control the lock 130T, which is located inside the physical space 110. For example, the lock 130T controls a garage door, which the user 112 wishes to open from outside.

To control the tunnel lock 130T, the user 112 may proceed as before, e.g., by operating a control such as the Select button on the key device 120. In response to the user operating the control, the key device 120 performs a discovery operation to determine whether it is within a mapped physical space and to identify all tunnel locks that are wirelessly detectable (discovery may also take place in the zone-lock example above). Here, the key device 120 determines that it is not in the physical space 110 but discovers tunnel lock 130T. The key device 120 and the tunnel lock 130T then establish a first point-to-point communication session 136, which may entail exchanging authentication content, such as identifying information and shared secrets. Once the first point-to-point session 136 is established, the tunnel lock 130T and the server apparatus 150 establish a second point-to-point communication session 138, which may also entail exchanging authentication content. In this arrangement, the tunnel lock 130T acts as a proxy for the server apparatus 150. The tunnel lock 130T may issue a human-detectable indication, e.g., via a light or sound, and the user 112 may select the self-identified lock 130T by operating a control (e.g., pressing Select again), causing the tunnel lock 130T to toggle state. For example, the garage door will open. If the user 112 wishes to select a different tunnel lock, the user may operate the second control (Next), e.g., using the process described above.

If the tunnel lock 130T had instead been located inside the mapped space 110, operation would proceed in the same way as when the lock 130T is outside, except that server apparatus 150 would have the option of identifying zone locks in addition to the tunnel lock 130T, and other tunnel locks, if present. The list 166 of lock candidates would thus include both zone locks and tunnel locks, ranked according to suitable criteria and likely interspersed, with the user 112 operating the same process to advance through the list 166 and to select the desired lock.

FIG. 1 further shows an example of a contact lock 130C. In this example, the contact lock 130C and the key device 120 are both located outside the mapped physical space 110. The user 112 may control the contact lock 130C by causing the key device 120 to make physical contact with the contact lock 130C and operating a control (e.g., the Select button) while physical contact is being made. For example, physical contact may be facilitated by contact interfaces on both the key device 120 and the contact lock 130C. Each of the contact interfaces may include an optical transmitter and an optical receiver for exchanging data. The contact lock 130C toggles in response to the user operation, which causes authentication content to be transmitted between the key device 120 and the contact lock 130C. Although operation of the contact lock 130C does not directly benefit from the enhanced security of the server apparatus 150, the key device 120 nevertheless stores information about the operation on the contact lock 130C and logs the information to the server apparatus 150 at a later time, e.g., when the key device 120 next returns to the mapped space 110.

Figure 2:
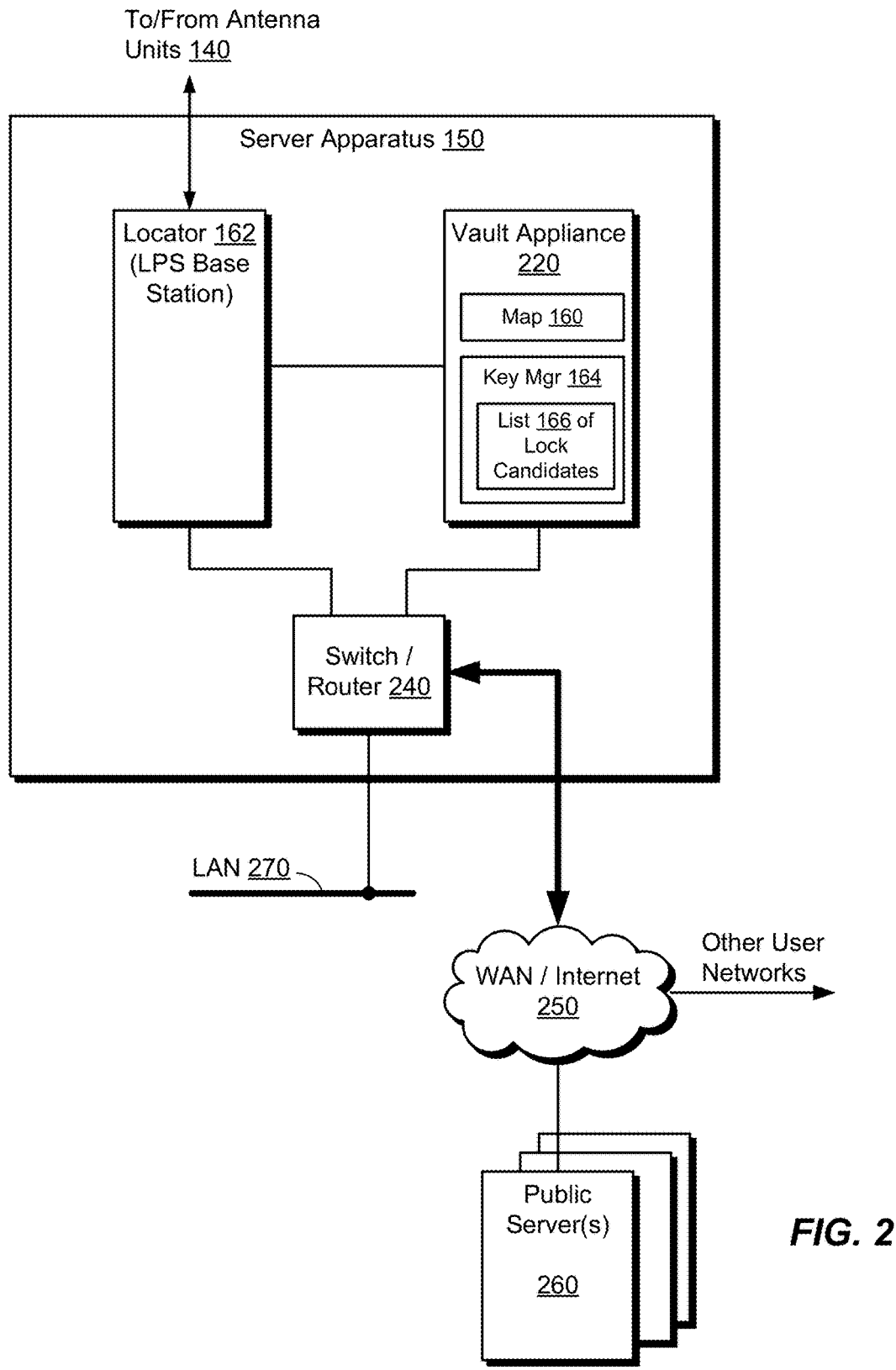
FIG. 2 is a block diagram of an example server apparatus of FIG. 1.

FIG. 2 shows an example of the server apparatus 150 and related components in additional detail. As shown, the server apparatus 150 includes the locator 162, a vault appliance 220, and a switch/router 240. In various examples, these components may be provided separately, as a single integrated unit, or as any combination of physical units.

The locator 162 is operatively coupled to the antenna units 140 to form a location position service, or LPS, which measures locations of wireless devices in the physical space 110. In an example, the locator 162 performs location measurements on a per-packet basis, e.g., by correlating and comparing the same Wi-Fi packet as received by different antenna units 140. Wireless devices may trigger measurements of their own locations by emitting "locator packets," i.e., packets having little or no payload and generated for the purpose of prompting a location measurement. For example, the key device 120 may emit a locator packet upon the user 112 operating a control on the key device 120. In some examples, the key device 120 emits a locator packet that conveys an orientation measurement made by its IMU, thus providing the locator 162 information for computing both the location and direction of the key device 120 and enabling accurate construction of a virtual ray 122.

The vault appliance 220 is a secure hub for storing and dispatching rights. Such rights may include content rights for accessing particular content, communication rights for establishing communications with another party, and action rights for performing actions on particular devices or elements. In an example, zone locks are operated via action rights. Further information about vault appliances may be found in the above-incorporated U.S. patent application Ser. No. 15/347,551.

The vault appliance 220 may store profile information associated with locks 130, which may include, for example, any codes needed for operating a lock, a list of authorized users, schedule restrictions, frequency restrictions, and so forth. Each lock 130 has a designated owner, and the vault appliance 220 authorizes lock owners to establish settings and limitations on a per-lock basis. The vault 220 then enforces the limitations. By permitting different users to operate the key device 120 on a lock, the lock owner allows the key device 120 to be lent to others, so that others can control the lock. Restricting access on a per-lock basis limits the scope of access that others can have. For example, one can lend the key device 120 to a friend who is house-sitting, but establish settings in the vault 220 that prevent the friend from using the key device 120 to enter a locked attic.

In some examples, a lock owner may establish settings in the vault 220 that enable a lock to be accessed during an emergency, e.g., when neither the lock owner nor any other authorized user is available to operate the key device 120. For example, holding down the Select button for a predetermined amount of time may cause the key device 120 to enter an emergency access mode in which locks may be operated by anyone in possession of the key device 120. Lock owners should use care in selecting locks that may be operated in this emergency mode.

In an example, the switch/router 240 has a conventional design. For example, the switch/router 240 has LAN (Local Area Network) ports for connecting to the locator 162 and vault appliance 220, as well as for distributing a wired LAN 270 throughout the physical space 110. The switch/router 240 may also have a WAN (Wide Area Network) port, for connecting to a WAN/Internet 250. In some examples, the switch/router 240 is a wired device only, with wireless services performed by the locator 162, e.g., using one or more of the antenna units 140. In other examples, the switch/router 240 directly supports both wired and wireless communications.

Using the WAN port, the switch/router 240 may connect to one or more public servers 260. These may include online stores (e.g., for buying software) and various servers to support vault-based communications. The switch/router 240 also supports communication over the WAN/Internet 250 with similarly-configured networks of other users, e.g., to remote access to rights stored in the vault appliance 220.

The locator 162 and the vault appliance 220 may each include their own processing circuitry and memory. Each memory may store instructions which, when run by the respective processing circuitry, cause the processing circuitry to carry out various procedures and activities as may be described herein. Unless otherwise specified, any activities ascribed to the server apparatus 150 may be performed by any of the included components, or by any combination of such components.

Figure 3A:
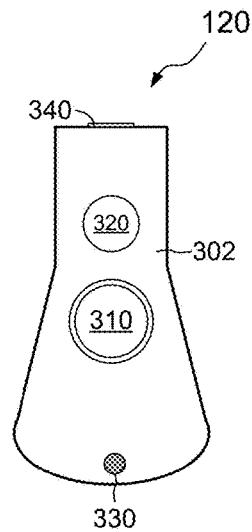
FIGS. 3A-3C are various views depicting an example key device of FIG. 1.
Figure 3B:
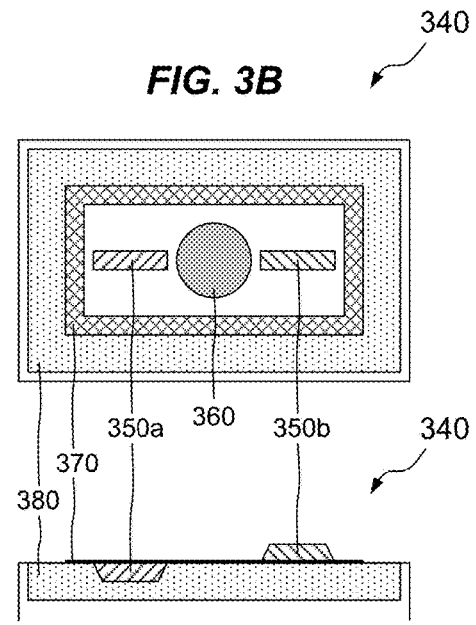
Figure 3C:

FIGS. 3A-3C show various views of an example key device 120. In the example shown, the key device 120 is provided as a small device, approximately 5 cm×3 cm×1 cm, i.e., approximately the same size as a conventional key fob. The key device 120 has a body 302, a first control 310, and a second control 320. In an example, the first control 310 is a Select button having a built-in thumbprint sensor, and the second control 320 is a Next button. The buttons 310 and 320 may be implemented in any suitable way and are preferably multi-functional, such that each button may perform different functions based on context. The key device 120 further includes a visual indicator 330, such as a multi-colored LED (light-emitting diode), which may be configured to illuminate with different colors and/or to blink with different patterns to indicate various states. The key device 120 has a portable power source, such as a battery, and preferably has an access port (not shown) or a separable structure that enables the battery to be changed. The overall design of the key device 120 is one of simplicity and versatility.

The key device 120 further includes a contact interface 340, such as the one described in connection with contact lock 130C above, which the user 112 may employ to activate contact locks and for other purposes. FIGS. 3B and 3C respectively show magnified top and side views of an example contact interface 340. As shown, the contact interface 340 includes a slot 350a and a tab 350b, which are arranged to engage a tab 350b and slot 350a, respectively, of another contact interface 340 of like design. The tab slot 350a and tab 350b preferably have ramped edges to facilitate mating. An optical transceiver 360, which may include both a transmitter and a receiver, enables transmission and reception of infrared signals with an optical transceiver of a mated contact interface. A contact sensor 370 detects when the contact interface 340 is mated with another contact interface, and a magnetic region 380 enables the contact interface 340 to form a secure and positive connection with its mate. For example, the contact interface and its mate attract each other when brought into contact. In an example, no latching mechanism is provided; rather the contact interface 340 is easily mated and unmated, even in the dark. In an example, the key device 120 is configured to transmit over the optical transceiver 360 only when the contact sensor 370 indicates a mated connection. This restriction helps to avoid light leakage and thus detection by malicious users of content exchanged between transceivers.

Figure 4:
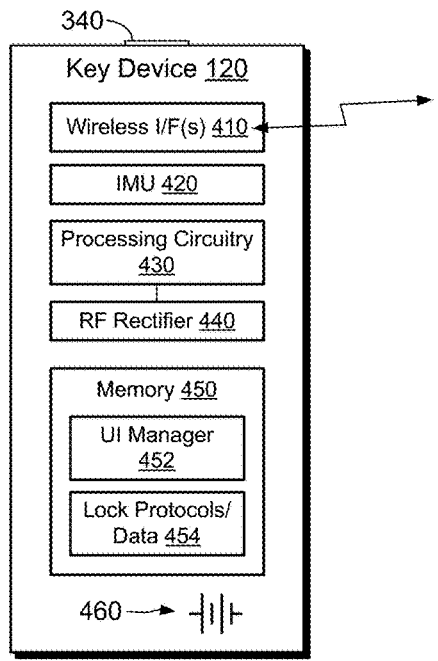
FIG. 4 is a block diagram of example electronic components of a key device, such as the one shown in FIGS. 3A-3C.

FIG. 4 shows example electronic components of the key device 120 in greater detail. The key device 120 is seen to include a set of wireless interfaces 410, such as a Wi-Fi interface and wireless interfaces according to other standards. These may include interfaces for communicating with tunnel locks that use standards other than Wi-Fi. Where feasible, the key device 120 may employ lower-power communication standards than Wi-Fi to conserve battery life.

The key device 120 may further include an IMU 420, for measuring the orientation of the key device 120, processing circuitry 430, such as one or more low-power microprocessors or microcontrollers, an RF (radio frequency) rectifier 440, memory 450, and a battery 460. The RF rectifier 440 is configured to receive RF energy from an external transmitter, such as a lock, and to apply the received energy to turn on the key device 120, or to wake the key device 120 from a sleep state. The memory "includes," i.e., realizes by execution of software instructions, a UI (user interface) manager 452, e.g., for controlling the buttons 310 and 320 and indicator 330, and various lock protocols and data 454. The lock protocols and data 454 contain instructions for operating the key device 120 in various modes, such as with zone locks, tunnel locks, and contact locks. They also persistently store information, such as codes, encryption keys, thumbprint data, and user identifiers.

Figure 5:
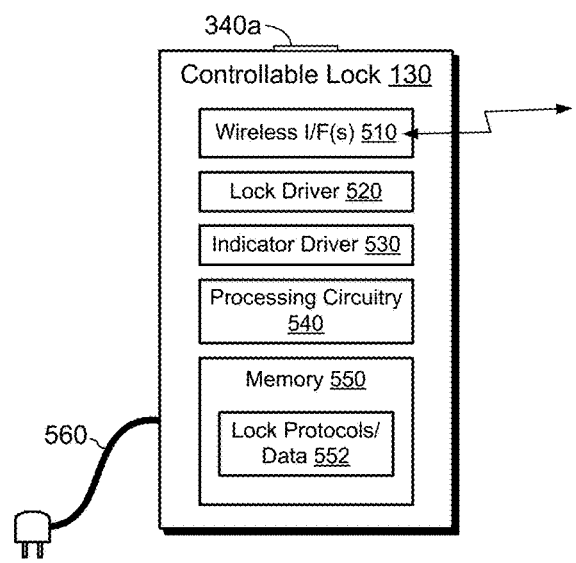
FIG. 5 is a block diagram of an example controllable lock of FIG. 1.

FIG. 5 shows further details of an example controllable lock 130, which may be descriptive of the controllable locks 130 shown in FIG. 1. The controllable lock 130 includes a set of wireless interfaces 510, such as Wi-Fi and other supported standards, a lock driver 520, e.g., an electronic circuit that drives the lock 130 between locked and unlocked states, an indicator driver 530, such as circuitry for driving a speaker or indicator light, processing circuitry 540, and memory 550. The memory 550 includes lock protocols and data 552, which enable the lock 130 to operate as a zone lock, tunnel lock, or contact lock. For operation as a contact lock, the controllable lock 130 may include a contact interface 340a, i.e., one designed to mate with the contact interface 340 on the key device 120. In some examples, the controllable lock 130 also includes a line cord 560, which enables the controllable lock 130 to plug into a wall outlet for receiving household power. For automotive and other mobile applications, the line cord 560 may be replaced with a cable connecting to a large-capacity battery, such as a car battery.

Figure 6:
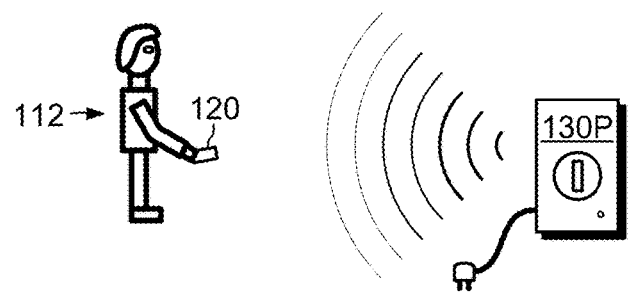
FIG. 6 is a front view of an example arrangement for activating the key device based on proximity to a controllable lock.

FIG. 6 shows an example arrangement for activating a key device 120 based on proximity to a controllable lock 130P. Here, the lock 130P, which has ample available power on account of its being plugged into a wall outlet or large battery, is configured to emit bursts of wireless energy on a regular basis, such as periodically. The RF rectifier 440 in the key device 120 may receive some of this wireless energy. When the key device 120 gets to within a certain proximity of the lock 130P, the RF rectifier 440 receives enough energy to trigger the key device 120 to turn on or to wake from a sleep state, such that it transitions from an inactive state to an active state.

In some examples, the key device 120, upon transitioning to the active state, initiates a protocol to toggle the state of the lock 130P. For example, the key device 120 may automatically send a first request 124, without requiring the user to push a button. The user 112 may then confirm the selection in the usual way. If the lock 130P is a tunnel lock, the key device 120 may initiate a point-to-point communication session 136 (FIG. 1) with the lock 130P. In some cases, the key device 120 may open or close the lock 130P directly, without requiring any user input, e.g., in cases where security concerns are low and the identity of the lock 130P is unambiguous. The owner of the lock 130P may enable this behavior by establishing appropriate settings for the lock 130P in the vault appliance 220.

In some examples, an action by the user 112 of the key device 120 in close proximity to a lock may initiate a protocol to toggle the lock automatically. For example, a verbal command from the user 112 received by a lock may serve as a selection of that lock for operation. The user 112 may confirm the selection by pushing a button on the key device 120. Also, the user directly touching the key device 120 to the lock 130P, the user 112 triggering a proximity sensor around the lock 130P, or the user 112 pressing a button on the lock 130P may act to select the lock 130P for operation.

Figure 7:
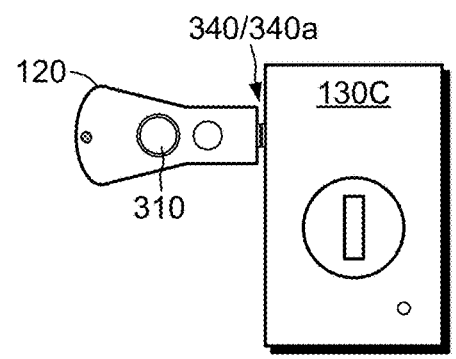
FIG. 7 is a front view of an example arrangement for controlling a lock based on physical contact with a key device.

FIG. 7 shows an example arrangement for operating a contact lock 130C. Here, the user 112 physically mates the contact interface 340 on the key device 120 with the contact interface 340a on the contact lock 130C. Once the contact interfaces are mated, the user 112 operates a control, such as the Select button 310, to initiate a protocol to operate the contact lock 130C. The protocol may involve the key device 120 sending a shared secret, such as an operating code, to the contact lock 130C over the optical connection formed between the respective infrared transceivers. In some examples, operation of the contact lock 130C depends upon the user 112 successfully authenticating to the key device 120, e.g., using the thumbprint sensor.

Figure 8:
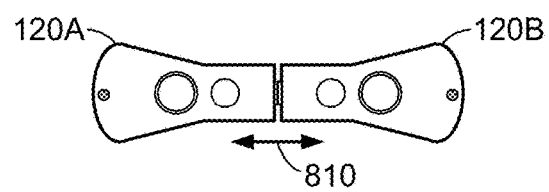
FIG. 8 is a top view of an example arrangement for performing an introduction between users of respective key devices.

FIG. 8 shows an example arrangement for exchanging information between different users having respective key devices 120A and 120B. For example, users may meet when they are away from home and may wish to establish a communication right with each other. To this end, the users may mate the key devices 120A and 120B together via their respective communication interfaces. While the key devices are mated, the users each operate a control, such as the Select button, on the respective key devices. Preferably, this act involves each user authenticating to the respective key device via its thumbprint sensor. Once the users are authenticated, the key devices exchange information over the optical connection, such as user identifiers. When each user returns home, the respective key device synchronizes with the respective server apparatus 150, enabling the users to establish the desired communication right via the respective vault appliances 220.

Figure 9:
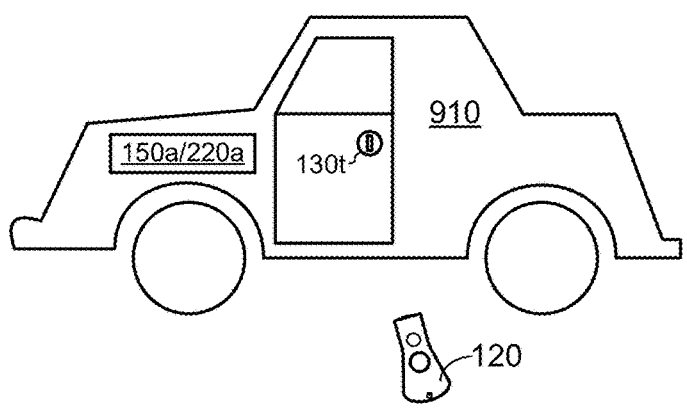
FIG. 9 is a side view of an example automobile that houses a server device and includes a controllable lock.

FIG. 9 shows an example arrangement for controlling a tunnel lock 130t in a mobile environment, such as in an automobile 910. In this example, the automobile 910 has its own server apparatus 150a, which includes its own locator 162 and vault appliance 220a. The mapped physical space in this example may be the volume of the automobile itself. The user 112 may operate the tunnel lock 130t in a manner similar to that described above for tunnel lock 130T. In an example, the vault appliance 220a is adapted for mobile use and provides limited access to user rights. For example, vault 220a may be configured as a satellite vault of the vault appliance 220 in the server apparatus 150.

Figure 10:
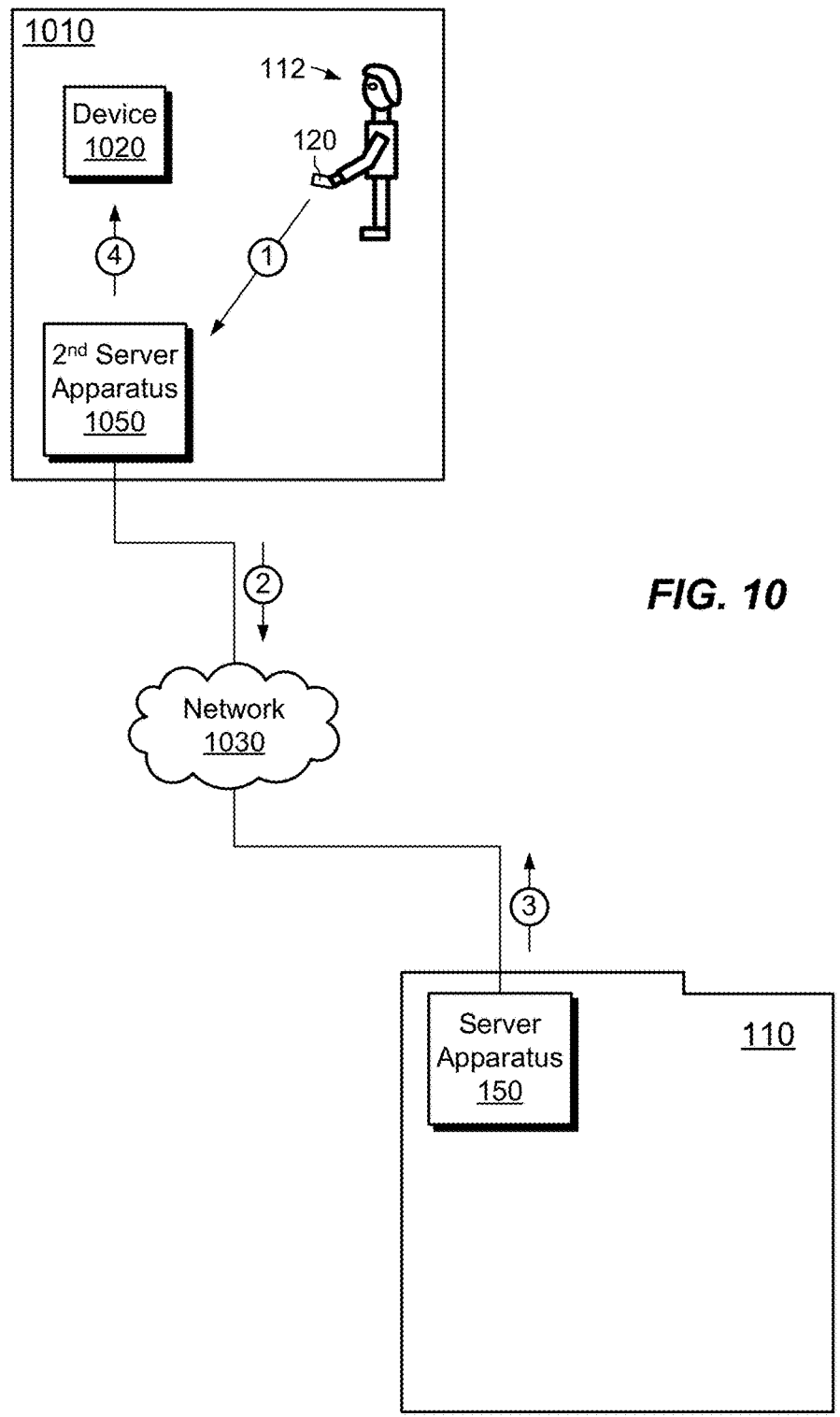
FIG. 10 is a block diagram of an example arrangement in which a user of the key device is identified from a physical location of a second server apparatus.

In some examples, the key device 120 may serve other functions besides controlling locks. FIG. 10 shows an example arrangement for using the key device 120 for providing user identification. Here, the user 112 has traveled from home to a mapped space 1010 that has its own server apparatus 1050, which is similar to the server apparatus 150 in the physical space 110 (FIG. 1) but is controlled by a different entity. For example, the physical space 1010 may be an office building. The user 112 may wish to provide identification in order to obtain a security badge, which authorizes the user 112 to work in the physical space 1010. In an example, the key device 120 may serve as a mechanism for providing the required information. Encircled numerals show an example sequence of operations.

At (1), the user 112 operates a control on the key device 120, such as the Select button, and authenticates to the key device 120 using the thumbprint sensor. In response, the key device 120 sends a user identifier of the user 112 to the server apparatus 1050. At (2), a vault appliance in the server apparatus 1050 contacts the vault appliance 220 in the server apparatus 150, e.g., over a network 1030 (e.g., the Internet), to request identifying information about the user 112. The request may include the user identifier. At (3), the vault appliance 220 in the server apparatus 150 provides the identifying information about the user to the server apparatus 1050. At (4), the server apparatus 1050 provides the identifying information to an element, such as an ID card printer 1020. The ID card printer 1020 may then print an ID card that displays the identifying information about the user 112, such as the user's name, company, and any other desired information, e.g., based on rights defined in the vault appliance 220. Additional information about communication protocols between vault appliances may be obtained from the above-incorporated U.S. patent application Ser. No. 15/347,551.

In other examples, the key device 120 may be used to unlock a software entity, such as a login function on a computer or computer-accessible resource. For example, in response to a request to access a login function, such as a login screen on a computer, the vault 220 in the server apparatus 150 sends a message to the key device 120, and the user 112 is required to perform an action on the key device 120, such as to push the Select button, to allow the login function to be accessed. In this manner, even the act of accessing a login function can be restricted and dispatched in accordance with rights defined in the vault 220, and the key device 120 performs a gating function that either allows or prohibits a requested operation.

Figure 11:
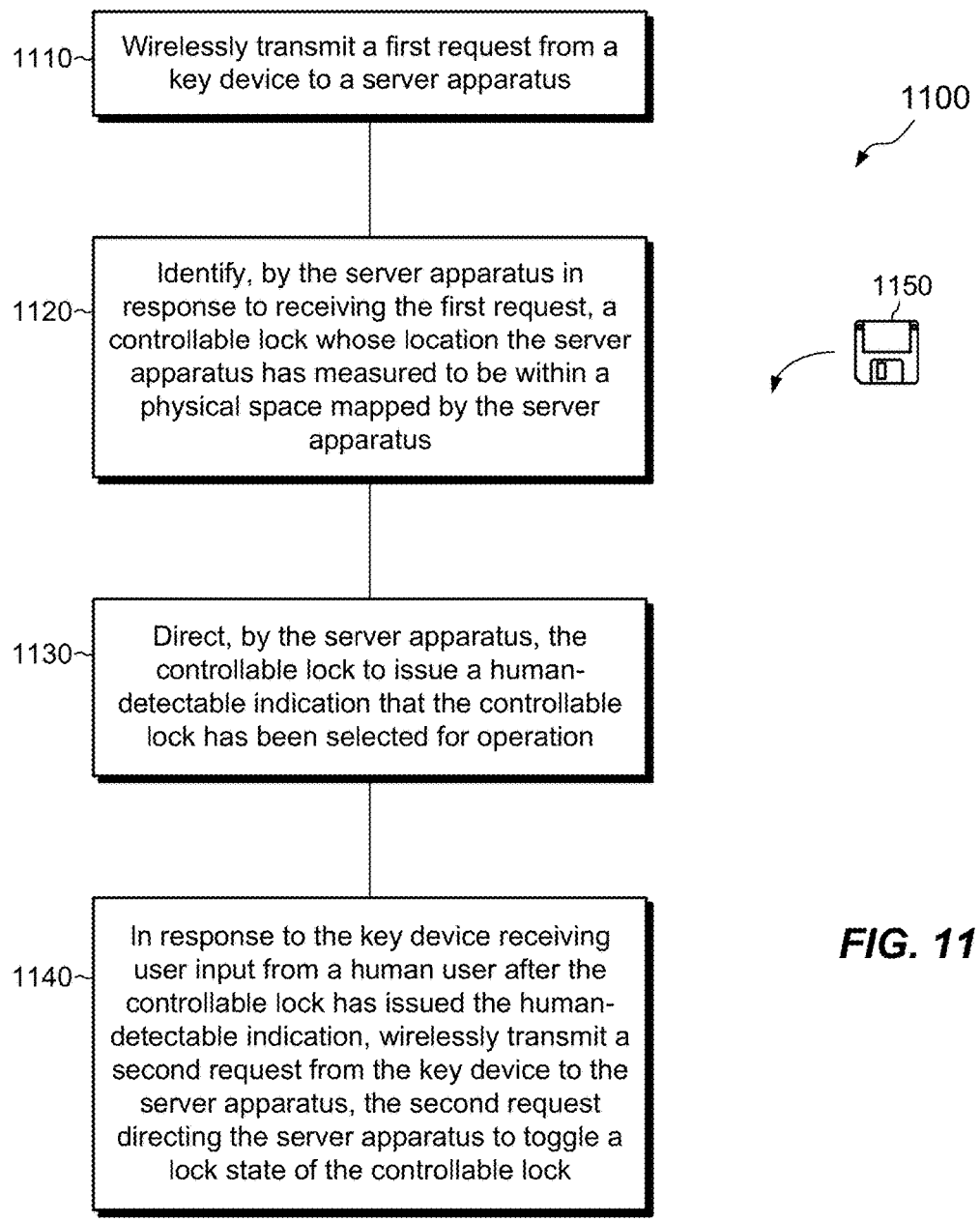
FIG. 11 is a flow chart showing an example method of controlling lockable devices.

FIG. 11 shows an example method 1100 that may be carried out in connection with the environment 100. The method 1100 is typically performed, for example, by the structures and software constructs described in connection with FIGS. 1-5, which may reside in memory of the key device 120, server apparatus 150, and/or locks 130, and are run by associated processors. The various acts of the method 1100 may be ordered in any suitable way, which may include performing some acts simultaneously.

At 1110, a first request 124 is wirelessly transmitted from a key device 120 to a server apparatus 150. For example, the user 112 operates a control, such as a Select button 310, which may require activating a thumbprint sensor. In response to the button-push and successful authentication of the user 112 using the thumbprint sensor, the key device 120 sends the first request 124, e.g., in a Wi-Fi packet 124a. The Wi-Fi packet 124a may induce a measurement by the locator 162 of the location of the key device 120 in the physical space 110. In some examples, the Wi-Fi packet 124 conveys an orientation measurement made by an IMU 420 within the key device 120, such that the server apparatus 150 receiving the Wi-Fi packet 124a can generate a virtual ray 122, which indicates a direction in which the key device 120 is pointing. In other examples, the key device 120 may send the first request 124 automatically, e.g., upon transitioning from an inactive state to an active state, as described in connection with FIG. 6, or based on physical contact, voice activation, or the like.

At 1120, in response to receiving the first request 124, the server apparatus 150 identifies a controllable lock 130 whose location the server apparatus 150 has measured to be within a physical space 110 mapped by the server apparatus 150. For example, the server apparatus 150 may generate a list 166 of lock candidates and rank the list 166 based on locations of locks relative to the key device 120, distance of the locks from the virtual ray 122, obstructions in the physical space, prior user behavior, and/or other factors. The server apparatus 150 may then select the top-ranking lock as the identified lock.

At 1130, the server apparatus 150 directs the controllable lock 130 to issue a human-detectable indication that the controllable lock 130 has been selected for operation. For example, the server apparatus 150 sends a message to the selected lock over Wi-Fi. In response, the selected lock identifies itself to the user 112, e.g., by illuminating a light, which may include blinking the light or cycling through an illumination pattern, by making a sound, such as a pattern of beeps, or in some other way that identifies the selected lock to the user 112.

At 1140, in response to the key device 120 receiving user input from a human user 112 after the controllable lock 130 has issued the human-detectable indication, the key device 120 wirelessly transmits a second request 126 to the server apparatus 150. The second request 126 directs the server apparatus 150 to toggle a lock state of the controllable lock 130. For example, the user 112 presses the Select button again, which causes the lock to toggle state, e.g., to lock or unlock.

In some examples, the server apparatus 150 identifies a lock at step 1120 that differs from the lock the user 116 wishes to control, and the user 112 may iterate through different choices by operating a control, such as the Next button 320, until the desired lock identifies itself.

An improved technique has been described for controlling lockable devices 130, in which a key device 120 wirelessly transmits a first request 124 to a server apparatus 150. The server apparatus 150 receives the first request 124 and proceeds to identify a controllable lock 130 whose location the server apparatus 150 has measured to be within a physical space 110 mapped by the server apparatus 150. The server apparatus 150 directs the identified controllable lock 130 to issue a human-detectable indication, such as a light or sound. A user 112 of the key device 120, who may observe the human-detectable indication, then provides user input to the key device 120, which causes the key device 120 to wirelessly transmit a second request 126 to the server apparatus 150. The second request 126 directs the server apparatus 150 to toggle a lock state of the identified controllable lock, such as to lock the controllable lock or to unlock it. Additionally, techniques have been described for operating tunnel locks, operating contact locks, and for using the key device 120 for introductions, identification, and gating of software-controlled functions.

Having described certain embodiments, numerous alternative embodiments or variations can be made. For example, embodiments have been described that involve the use of a vault appliance 220 and a particular type of locating technology. However, these are merely examples, as embodiments may be constructed using other security equipment and different locating procedures.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1150 in FIG. 11). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of electronically controlling lockable devices, the method comprising:
wirelessly transmitting a first request from a key device to a server apparatus;
identifying, by the server apparatus in response to receiving the first request, a controllable lock whose location the server apparatus has measured to be within a physical space mapped by the server apparatus;
directing, by the server apparatus, the controllable lock to issue a human-detectable indication that the controllable lock has been selected for operation; and
in response to the key device receiving user input from a human user after the controllable lock has issued the human-detectable indication, wirelessly transmitting a second request from the key device to the server apparatus, the second request directing the server apparatus to toggle a lock state of the controllable lock.

2. The method of claim 1, further comprising:
measuring, by the server apparatus, a physical location of the key device relative to the physical space,
wherein identifying the controllable lock includes selecting, by the server apparatus, the controllable lock from among multiple controllable locks in the physical space based at least in part on a location of the key device and respective locations of the multiple controllable locks.

3. The method of claim 2, wherein wirelessly transmitting the second request from the key device to the server apparatus is performed after:
the server apparatus has directed a first candidate lock of the multiple controllable locks in the physical space to issue a human-detectable indication; and
in response to a user action, the key device has wirelessly transmitted a request to indicate a next candidate lock of the multiple controllable locks.

4. The method of claim 2,
wherein the key device further includes an orientation sensor,
wherein the first request includes an orientation measurement made by the orientation sensor, the orientation measurement indicating a direction which the key device is pointing, and
wherein selecting, by the server apparatus, the controllable lock is further based on the orientation measurement.

5. The method of claim 4,
wherein identifying the physical location of the key device is performed by sensing a wireless packet emitted by the key device using a location positioning service that includes multiple antenna units.

6. The method of claim 2, wherein the server apparatus stores a map of the physical space, and wherein selecting, by the server apparatus, the controllable lock is further based on the map of the physical space indicating that the key device has an unobstructed view of the controllable lock.

7. The method of claim 1,
wherein, prior to transmitting the first request, the method further comprises performing, by the key device, a biometric test of the user of the key device to confirm an identity of the user, and
wherein the key device is configured to transmit the first request in response to the biometric test succeeding and to prevent transmission of the first request in response to the biometric test not succeeding.

8. The method of claim 7, wherein performing the biometric test includes operating a thumbprint sensor in the key device.

9. The method of claim 8, wherein the thumbprint sensor is incorporated in a button of the key device, and wherein transmitting the first request is performed in response to (i) the user pushing the button and (ii) the key device successfully authenticating the user using the thumbprint sensor.

10. The method of claim 9, further comprising, in response to the user pushing the button on the key device when the key device is disposed in a second physical space mapped by a second server apparatus, providing identifying information about the user to an element in the second physical location by:
(i) the key device wirelessly sending a user identifier of the user to the second server apparatus,
(ii) the second server apparatus contacting the server apparatus to request the identifying information about the user,
(iii) the server apparatus providing the identifying information about the user to the second server apparatus, and
(iv) the second server apparatus providing the identifying information about the user to the element in the second physical space.

11. The method of claim 2, further comprising operating the key device to unlock a second controllable lock, the key device establishing a first point-to-point session with the second controllable lock, the second controllable lock establishing a second point-to-point session with the server apparatus, the server apparatus directing the second controllable lock to unlock in response to exchanging authentication content over the first point-to-point session and the second point-to-point session.

12. The method of claim 11 wherein, when operating the key device to unlock the second controllable lock, the key device is disposed outside the mapped physical space.

13. The method of claim 11, wherein the server apparatus is a mobile server apparatus disposed within an automobile.

14. The method of claim 11, wherein the key device is a portable device having a portable power source, and wherein the method further comprises:
the key device assuming an inactive state; and
the key device transitioning from the inactive state to an active state in response to the key device receiving wireless energy emitted by the second controllable lock,
wherein the server apparatus directing the second controllable lock to unlock is performed automatically in response to the key device transitioning from the inactive state to the active state.

15. The method of claim 2, further comprising operating the key device to unlock a third controllable lock, the key device effecting unlocking of the third controllable lock by (i) making physical contact with the third controllable lock and (ii) while making physical contact, sending a shared secret to the third controllable lock over an optical connection.

16. The method of claim 15, wherein sending the shared secret over the optical connection is carried out in response to a user operation performed on the key device while the key device and the third controllable lock are making physical contact.

17. The method of claim 15, wherein the key device includes a contact interface having an infrared transceiver, and wherein the method further comprises:
with the contact interface of the key device placed against a contact interface of a second key device, exchanging, over the optical connection, identifying information about the user of the key device and a second user of the second key device to enable subsequent communication between the user and the second user.

18. The method of claim 2, wherein the key device is a portable device having a portable power source, and wherein the method further comprises:
the key device assuming an inactive state; and
the key device transitioning from the inactive state to an active state in response to the key device receiving wireless energy emitted by the controllable lock.

19. The method of claim 18, wherein transmitting the first request is performed automatically by the key device upon transitioning from the inactive state to the active state.

20. An electronic key device, comprising:
a body;
a user control in the body; and control circuitry including a set of processors and memory, the control circuitry constructed and arranged to:
  wirelessly transmit, in response to a first operation of the user control, a first request to a server apparatus, the first request directing the server apparatus to identify a controllable lock whose location the server apparatus has measured to be within a physical space mapped by the server apparatus; and
  in response to a second operation of the user control, wirelessly transmit a second request from the key device to the server apparatus, the second request directing the server apparatus to toggle a lock state of the controllable lock identified in response to the first operation of the user control.

21. A computer program product including a set of non-transient, computer-readable media that store instructions which, when executed by control circuitry, cause the control circuitry to perform a method of controlling lockable devices, the method comprising:
  wirelessly receiving, by a server apparatus, a first request from a key device;
  identifying, by the server apparatus in response to receiving the first request, a controllable lock whose location the server apparatus has measured to be within a physical space mapped by the server apparatus;
  directing, by the server apparatus, the controllable lock to issue a human-detectable indication that the controllable lock has been selected for operation;
  in response to the key device receiving user input from a human user after the controllable lock has issued the human-detectable indication, wirelessly receiving, by the server apparatus, a second request from the key device; and
  toppling, by server apparatus in response to receiving the second request, a lock state of the controllable lock.

22. The electronic key device of claim 20,
  wherein, the control circuitry is further constructed and arranged to perform a biometric test of a user of the key device to confirm an identity of the user prior to transmission of the first request, and
  wherein the key device is configured to transmit the first request in response to the biometric test succeeding and to prevent transmission of the first request in response to the biometric test not succeeding.

* * * * *